Patented Dec. 23, 1958

2,865,803

NEMATOCIDAL COMPOSITION AND METHODS EMPLOYING CYCLOHEXYL ISOTHIOCYANATES

Norman J. Lewis, Des Peres, Mo., assignor to Monsanto Chemical Company, St. Louis, Mo., a corporation of Delaware No Drawing. Application June 13, 1955
Serial No. 515,265

5 Claims. (Cl. 167—30)

This invention relates to methods of controlling parasitic worms and minimizing worm populations in agricultural soils. More specifically, the invention relates to the destruction of nematodes, trematodes and cestodes in any of the egg, larvae, and adult stages of their life cycles, and particularly the parasitic worms which inhibit the normal development of crop plants.

The problem of controlling nematodes and other objectionable worm life is usually a complex problem, because to be an effective toxicant a compound must be able to penetrate the normally impervious cutex of the worm and the enclosing membranes of the larvae and eggs, and to interfere with a vital function of the organism. The mechanism of destroying the soil worm life is not fully understood, but it is believed that effective toxicants destroy or reduce the effectiveness of vital enzymes. However, a compound which is known to be capable of penetrating the membranes and capable of destroying critical enzymes of the organism may not be a suitable toxicant. The compound must be such that it will remain in the soil in contact with the undesirable worm life for a sufficient period of time to effect the penetration of the worm and destruction or inhibition of the vital enzymes. To achieve this end, it will be necessary for the toxicant to resist the destructive activity of soil bacteria, be capable of wetting the organism, to have a substantial water-dispersibility, to be capable of being readily mixed with the soil, and to have a sufficiently low vapor pressure so that it is not evaporated before the destructive purpose is accomplished. Due to the exacting requirements of a practicable toxicant, it is impossible to predict the effectiveness of a particular chemical.

In accordance with this invention it has been found that effective nematocidal control can be obtained by treating the soil with cyclohexyl isothiocyanate.

In the use of cyclohexyl isothiocyanate in the destruction of nematodes and other objectionable worm life, the compound may be applied directly to the soil at rates of 10 to 500 lbs. per acre and may be added in pure state or mixed with suitable liquid or solid diluents. The preferred level of application useful in treating soils of average nematode infestation will be from 25 to 100 lbs. per acre. Obviously, heavily infested areas may require the use of higher proportions and lightly infested areas may be treated effectively with smaller proportions.

The cyclohexyl isothiocyanate may be added to the soil in solid formulations, frequently referred to as dusts, which may contain in addition to the active ingredient, diluents of extenders to absorb the readily volatile toxicant and thereby prevent the too rapid dissipation, and dispersing agents to prevent local high concentrations. In addition, these components facilitate the distribution of the active ingredient in soil or soil waters.

Suitable solid diluents are those which render the compositions dry and permanently free-flowing. Thus hygroscopic materials should be avoided. Effective solid diluents are the finely divided carriers, including the clays such as the kaolinites, the bentonites and the attapulgites; other minerals in natural state, such as talc, pyrophyllite, quartz, diatomaceous earth, fuller's earth, chalk, rock phosphate and sulfur; and chemically modified minerals, such as acid washed bentonites, precipitated calcium phosphates, precipitated calcium carbonate and colloidal silica. These diluents may represent a substantial portion, for example 50 to 98 percent by weight of the entire formulations. Compositions of this type are useful where there is a tendency for the nematocide to be phytotoxic.

Liquid compositions for nematocidal uses may be solutions or liquid dispersions. The choice of the liquid medium will depend to a great extent upon the physical properties of the active ingredient. If the cyclohexyl isothiocyanates are water-soluble, the liquid compositions may be merely an aqueous solution. Where the active component is insoluble in water or soluble only to a limited extent, it is frequently desirable to add a small amount of an organic solvent which can be readily dispersed in the aqueous medium to produce a heterogenous dispersion of the active ingredient in water.

A valuable class of nematocidal formulations are those wherein there is present a surface active agent, which serves in providing formulations capable of being uniformly distributed in the soil. The surface active agents may be anionic, cationic, or non-ionic and include conventional soaps, such as the water-soluble salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methyl-ethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil.

A useful formulation of the cyclohexyl isothiocyanate may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil being treated. For this purpose readily flowable compositions are required, either liquid or solid in physical state. Thus a critical aspect of the invention is the fluent carrier by use of which optimum nematocidal effects can be obtained.

Although the cyclohexyl isothiocyanates may be used in the pure state, it appears that more effective utilization of the active component is obtained when formulated with the conditioning agents as described.

Although the cyclohexyl isothiocyanates may be used in formulations as described above, it is often more convenient to use the toxicants in their free state. Since the cyclohexyl isothiocyanates are relatively volatile liquids, they may be injected into the soil using regularly spaced injections of such size and distribution so that the entire volume of soil to be treated will contain an effective concentration of the toxicant.

The cyclohexyl isothiocyanates, the use of which is included within the scope of this invention, have other beneficial effects on the soil, for example insect eggs and larvae may be destroyed or their population reduced. Also many other undesirable organisms, such as weed seeds and fungi, will be destroyed or their vitality seriously affected by treating the soil with cyclohexylisothiocyanate.

Further details of the practice of this invention are set forth with respect to the following example.

*Example 1*

A preliminary screening experiment was conducted by preparing a suspension of the nematode *Panagrellus redivivis* in water and observing through a microscope the motility of the organisms in the presence of varying concentrations of the reagent. The nematode in aqueous suspension will normally flex its body at a regular rate and as the nematoicide takes effect the rate of flexation is decreased until death of the organism occurs. When the motility of the organism is studied at varying concentrations of cyclohexyl isothiocyanate, it was found that at a concentration of 0.1 percent and 0.01 percent complete destruction of the nematode was effected in 24 hours.

In secondary nematocidal tests the soil infested with the nematode and *Meloidogyne incognita* var. *acreta* was treated with isothiocyanate at the rate of 200 lbs. per acre and 100 percent control of the nematode was effected. In parallel experiments conducted in an identical manner except in the use of phenyl isothiocyanate, a known nematocide, no noticeable control of the nematocide was observed.

The expression "a cyclohexyl isothiocyanate" as used in this specification and its appended claims is generic and includes in addition to the single chemical compound, cyclohexyl isothiocyanate, the very similar compounds containing halogen, such as chlorine, fluorine, bromine and iodine and/or alkyl substituents, such as methyl, ethyl, n-propyl, isopropyl, hexyl, 2-ethylhexyl and lauryl, on the saturated six member rings. For example, the compounds represented by the following chemical structure are included.

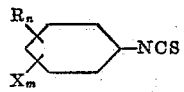

wherein R is an alkyl group having up to three carbon atoms, X is a halogen atom, and *m* and *n* are each integers from 0 to 3 provided that the sum of *m* and *n* does not exceed 5.

What is claimed is:
1. A method of destroying nematodes in nematode infected agricultural solids which comprises contacting the organism with a compound having the chemical structure:

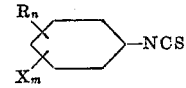

wherein R is an alkyl group having up to twelve carbon atoms, X is a halogen atom, and *m* and *n* are each integers from 0 to 3 provided that the sum of *m* and *n* does not exceed 5.

2. A method of destroying parasitic worm life in nematode infested agricultural soils which comprises contacting the organisms with a compound having the chemical structure

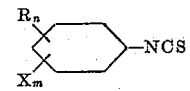

wherein R is an alkyl group having up to three carbon atoms, X is a halogen atom, and *m* and *n* are each integers from 0 to 3 provided that the sum of *m* and *n* does not exceed 5.

3. The method of controlling parasitic worm life in nematode infested agricultural soils which comprises dispersing in the soil from 25 to 100 lbs. per acre of cyclohexyl isothiocyanate.

4. The method of controlling parasitic worm life in nematode infested agricultural soils which comprises introducing into the soil a compound having the chemical structure.

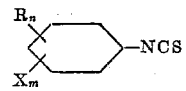

wherein R is an alkyl group having up to three carbon atoms, X is a halogen atom, and *m* and *n* are each integers from 0 to 3 provided that the sum of *m* and *n* does not exceed 5.

5. A nematocidal composition comprising a compound having the structure

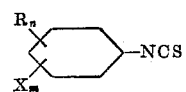

wherein R is an alkyl group having up to three carbon atoms, X is a halogen atom, and *m* and *n* are each integers from 0 to 3 provided that the sum of *m* and *n* does not exceed 5, and a surface active agent.

References Cited in the file of this patent
FOREIGN PATENTS

| 501,642 | Great Britain | Feb. 28, 1939 |
| 283,652 | Switzerland | Oct. 1, 1952 |
| 431,064 | Great Britain | July 1, 1935 |

OTHER REFERENCES

Ellenby et al.: Chem. Abst., vol. 47 (1953), page 253.
Frear: A Catalogue of Insecticides and Fungicides, vol. I, p. 72, (1947).
Blake: Chem. Abstr., vol. 37 (1943), page 5375.